US009390507B2

(12) United States Patent
Lee et al.

(10) Patent No.: US 9,390,507 B2
(45) Date of Patent: Jul. 12, 2016

(54) APPARATUS AND METHOD FOR HIERARCHICAL STEREO MATCHING

(75) Inventors: Junseo Lee, Seoul (KR); Jeongmok Ha, Seoul (KR); Intae Na, Seoul (KR); Hong Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/359,537

(22) PCT Filed: Jul. 4, 2012

(86) PCT No.: PCT/KR2012/005293
§ 371 (c)(1),
(2), (4) Date: May 20, 2014

(87) PCT Pub. No.: WO2013/077522
PCT Pub. Date: May 30, 2013

(65) Prior Publication Data

US 2014/0334716 A1 Nov. 13, 2014

(30) Foreign Application Priority Data

Nov. 23, 2011 (KR) ........................ 10-2011-0123170

(51) Int. Cl.
*G06T 7/00* (2006.01)

(52) U.S. Cl.
CPC ..... *G06T 7/0075* (2013.01); *G06T 2207/10012* (2013.01); *G06T 2207/10021* (2013.01); *G06T 2207/20016* (2013.01)

(58) Field of Classification Search
None
See application file for complete search history.

(56) References Cited

U.S. PATENT DOCUMENTS 6,043,844 A * 3/2000 Bist .......................... G06T 9/008 375/240.24
7,590,281 B2 * 9/2009 Jeong et al. .................... 382/154
7,933,336 B2 * 4/2011 Lee et al. ................. 375/240.16
2007/0250465 A1 10/2007 Moden
2010/0183243 A1 * 7/2010 Brand ................... G06T 3/0093 382/282
2011/0279652 A1 11/2011 Eggert et al.
2012/0163704 A1 * 6/2012 Chang et al. .................. 382/154
2012/0206451 A1 * 8/2012 Tian ...................... G06T 15/205 345/419

FOREIGN PATENT DOCUMENTS

KR 10-0806201 B1 2/2008
KR 10-2011-0114250 A 10/2011
WO WO 2009/014314 A1 1/2009

OTHER PUBLICATIONS

Changming Sun, A Fast Stereo Matching Method,Digital Image Computing: Techniques and Applications, pp. 95-100, Massey University, Auckland, New Zealand, Dec. 10-12, 1997.*
Park, Trellis-Based Systolic Multi-Layer Stereo Matching, IEEE 2003.*

(Continued)

*Primary Examiner* — Stephen R Koziol
*Assistant Examiner* — Pinalben Patel
(74) *Attorney, Agent, or Firm* — Birch, Stewart, Kolasch & Birch, LLP

(57) ABSTRACT

An apparatus and a method for hierarchical stereo matching are provided. In the method, a reduced image is formed by reducing left and right images, and a first Trellis is performed on the reduced image. Then, a magnified image is generated by magnifying the size and the brightness of the reduced image, and a second Trellis is performed on the magnified image.

19 Claims, 9 Drawing Sheets

| 99 | 99 | 99 | 99 | 99 | 99 | 99 | 99 | 99 | 99 | 99 | 99 | 99 | 99 | 99 | 99 |
|---|---|---|---|---|---|---|---|---|---|---|---|---|---|---|---|
| | | | | | | | | | | | | | | | |
| 99 | | | | | | | | | | | | | | | 99 |
| 99 | 99 | | | | | | | | | | | | | 99 | 99 |
| 99 | 99 | 99 | 99 | | | | | | | | | 99 | 99 | 99 | 99 |
| 99 | 99 | 99 | 99 | | | | | | | | | 99 | 99 | 99 | 99 |
| 99 | 99 | 99 | 99 | 99 | 99 | 99 | 99 | 99 | 99 | 99 | 99 | 99 | 99 | 99 | 99 |
| 99 | 99 | 99 | 99 | 99 | 99 | 99 | 99 | 99 | 99 | 99 | 99 | 99 | 99 | 99 | 99 |
| 99 | 99 | 99 | 99 | 99 | 99 | 99 | 99 | 99 | 99 | 99 | 99 | 99 | 99 | 99 | 99 |
| 99 | 99 | 99 | 99 | 99 | 99 | 99 | 99 | 99 | 99 | 99 | 99 | 99 | 99 | 99 | 99 |

(56) References Cited

OTHER PUBLICATIONS

Das, Active Surface Estimation: Integrating Coarse-to-fine image Acquisition and Estimation From Multiple Cues, Das, Artificial Intelligence 83 (1996) 241-266.*

L. Nalpantidis, Efficient Hierarchical Matching Algorithm for Processing Uncalibrated Stereo Vision Images and Its Hardware Architecture, The Institution of Engineering and Technolgy Image Processing, Aug. 2011.*

Laio, "Pyramid Multi-resolution Matching," Master Dissertation, 02S12004,University of Electronic Science and Technology of China, Jul. 31, 2005, pp. 38-39, along with an English translation.

Nalpantidis et al., "An Efficient Hierarchical Matching Algorithm for Processing Uncalibrated Stereo Vision Images and its Hardware Architecture," Draft, Democritus University of Thrace, Xanthi, Greece, Jun. 2010, pp. 1-19.

* cited by examiner

Fig. 1a
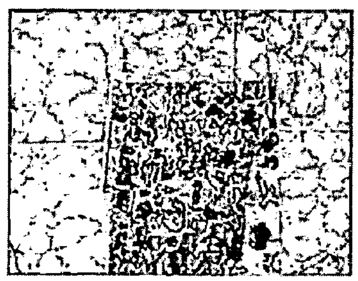
Fig. 1b
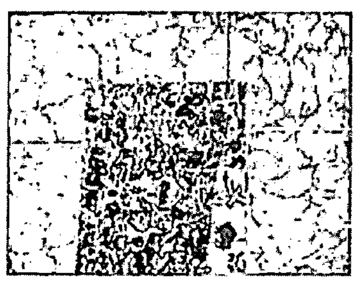
Fig. 2a
Fig. 2b
Figure 3a
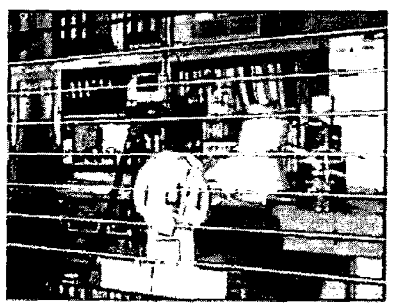

Fig. 9a

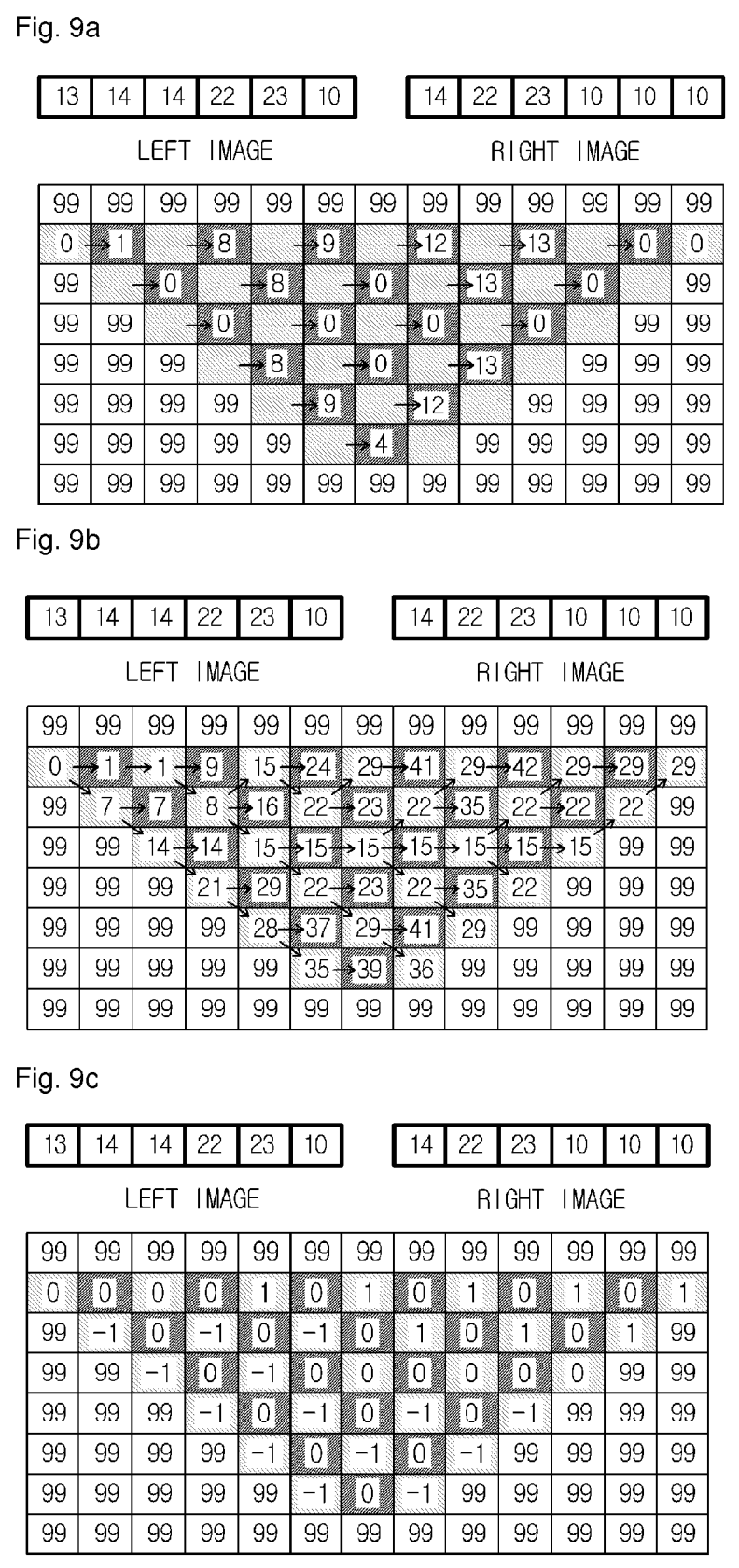

| 13 | 14 | 14 | 22 | 23 | 10 |
|---|---|---|---|---|---|

LEFT IMAGE

| 14 | 22 | 23 | 10 | 10 | 10 |
|---|---|---|---|---|---|

RIGHT IMAGE

| 99 | 99 | 99 | 99 | 99 | 99 | 99 | 99 | 99 | 99 | 99 | 99 | 99 |
|---|---|---|---|---|---|---|---|---|---|---|---|---|
| 0 | 1 | | 8 | | 9 | | 12 | | 13 | | 0 | 0 |
| 99 | | 0 | | 8 | | 0 | | 13 | | 0 | | 99 |
| 99 | 99 | | 0 | | 0 | | 0 | | 0 | | 99 | 99 |
| 99 | 99 | 99 | | 8 | | 0 | | 13 | | 99 | 99 | 99 |
| 99 | 99 | 99 | 99 | | 9 | | 12 | | 99 | 99 | 99 | 99 |
| 99 | 99 | 99 | 99 | 99 | | 4 | | 99 | 99 | 99 | 99 | 99 |
| 99 | 99 | 99 | 99 | 99 | 99 | 99 | 99 | 99 | 99 | 99 | 99 | 99 |

Fig. 9b

| 13 | 14 | 14 | 22 | 23 | 10 |
|---|---|---|---|---|---|

LEFT IMAGE

| 14 | 22 | 23 | 10 | 10 | 10 |
|---|---|---|---|---|---|

RIGHT IMAGE

| 99 | 99 | 99 | 99 | 99 | 99 | 99 | 99 | 99 | 99 | 99 | 99 | 99 |
|---|---|---|---|---|---|---|---|---|---|---|---|---|
| 0 | 1 | 1 | 9 | 15 | 24 | 29 | 41 | 29 | 42 | 29 | 29 | 29 |
| 99 | 7 | 7 | 8 | 16 | 22 | 23 | 22 | 35 | 22 | 22 | 22 | 99 |
| 99 | 99 | 14 | 14 | 15 | 15 | 15 | 15 | 15 | 15 | 15 | 99 | 99 |
| 99 | 99 | 99 | 21 | 29 | 22 | 23 | 22 | 35 | 22 | 99 | 99 | 99 |
| 99 | 99 | 99 | 99 | 28 | 37 | 29 | 41 | 29 | 99 | 99 | 99 | 99 |
| 99 | 99 | 99 | 99 | 99 | 35 | 39 | 36 | 99 | 99 | 99 | 99 | 99 |
| 99 | 99 | 99 | 99 | 99 | 99 | 99 | 99 | 99 | 99 | 99 | 99 | 99 |

Fig. 9c

| 13 | 14 | 14 | 22 | 23 | 10 |
|---|---|---|---|---|---|

LEFT IMAGE

| 14 | 22 | 23 | 10 | 10 | 10 |
|---|---|---|---|---|---|

RIGHT IMAGE

| 99 | 99 | 99 | 99 | 99 | 99 | 99 | 99 | 99 | 99 | 99 | 99 | 99 |
|---|---|---|---|---|---|---|---|---|---|---|---|---|
| 0 | 0 | 0 | 0 | 1 | 0 | 1 | 0 | 1 | 0 | 1 | 0 | 1 |
| 99 | −1 | 0 | −1 | 0 | −1 | 0 | 1 | 0 | 1 | 0 | 1 | 99 |
| 99 | 99 | −1 | 0 | −1 | 0 | 0 | 0 | 0 | 0 | 0 | 99 | 99 |
| 99 | 99 | 99 | −1 | 0 | −1 | 0 | −1 | 0 | −1 | 99 | 99 | 99 |
| 99 | 99 | 99 | 99 | −1 | 0 | −1 | 0 | −1 | 99 | 99 | 99 | 99 |
| 99 | 99 | 99 | 99 | 99 | −1 | 0 | −1 | 99 | 99 | 99 | 99 | 99 |
| 99 | 99 | 99 | 99 | 99 | 99 | 99 | 99 | 99 | 99 | 99 | 99 | 99 |

Fig. 9d
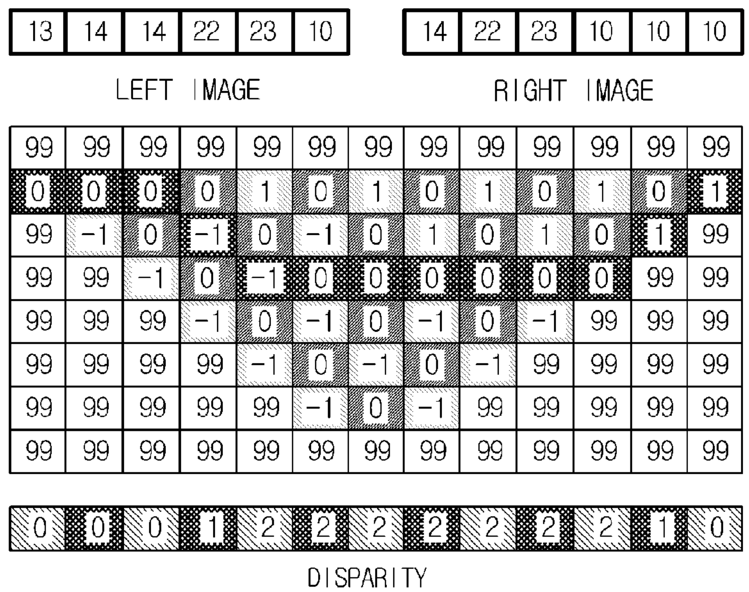
| 13 | 14 | 14 | 22 | 23 | 10 |
|---|---|---|---|---|---|
| 14 | 22 | 23 | 10 | 10 | 10 |
|---|---|---|---|---|---|
| 99 | 99 | 99 | 99 | 99 | 99 | 99 | 99 | 99 | 99 | 99 | 99 | 99 |
|---|---|---|---|---|---|---|---|---|---|---|---|---|
| 0 | 0 | 0 | 0 | 1 | 0 | 1 | 0 | 1 | 0 | 1 | 0 | 1 |
| 99 | -1 | 0 | -1 | 0 | -1 | 0 | 1 | 0 | 1 | 0 | 1 | 99 |
| 99 | 99 | -1 | 0 | -1 | 0 | 0 | 0 | 0 | 0 | 0 | 99 | 99 |
| 99 | 99 | 99 | -1 | 0 | -1 | 0 | -1 | 0 | -1 | 99 | 99 | 99 |
| 99 | 99 | 99 | 99 | -1 | 0 | -1 | 0 | -1 | 99 | 99 | 99 | 99 |
| 99 | 99 | 99 | 99 | 99 | -1 | 0 | -1 | 99 | 99 | 99 | 99 | 99 |
| 99 | 99 | 99 | 99 | 99 | 99 | 99 | 99 | 99 | 99 | 99 | 99 | 99 |
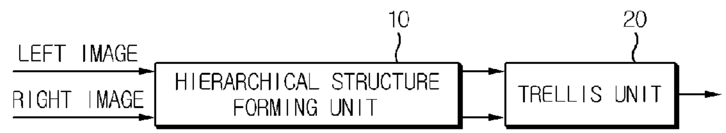
| 0 | 0 | 0 | 1 | 2 | 2 | 2 | 2 | 2 | 2 | 2 | 1 | 0 |
|---|---|---|---|---|---|---|---|---|---|---|---|---|
Fig. 10
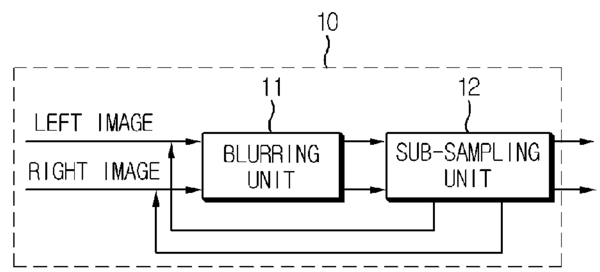
Fig. 11
Fig. 12
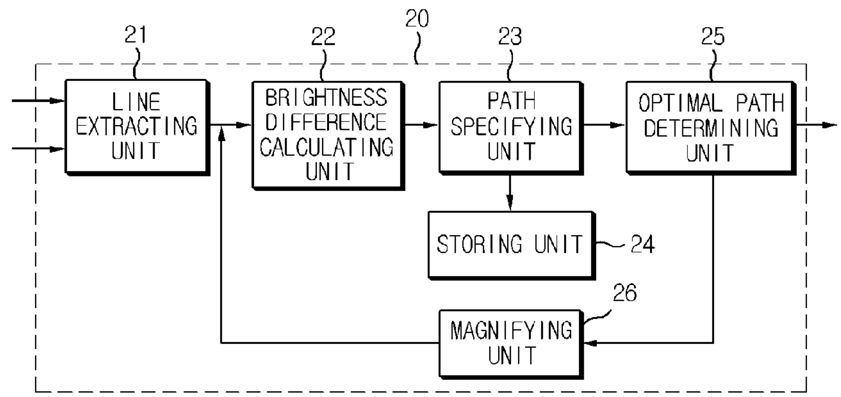

Fig. 13a

| 0 | 1 | 1 | 0 |
|---|---|---|---|
| 1 | 3 | 2 | 1 |
| 0 | 2 | 1 | 1 |
| 1 | 2 | 2 | 0 |

Fig. 13b

| 0 | 0 | 2 | 2 | 2 | 2 | 0 | 0 |
|---|---|---|---|---|---|---|---|
| 0 | 0 | 2 | 2 | 2 | 2 | 0 | 0 |
| 2 | 2 | 6 | 6 | 4 | 4 | 2 | 2 |
| 2 | 2 | 6 | 6 | 4 | 4 | 2 | 2 |
| 0 | 0 | 4 | 4 | 2 | 2 | 2 | 2 |
| 0 | 0 | 4 | 4 | 2 | 2 | 2 | 2 |
| 2 | 2 | 4 | 4 | 4 | 4 | 0 | 0 |
| 2 | 2 | 4 | 4 | 4 | 4 | 0 | 0 |

Fig. 13c

| 99 | 99 | 99 | 99 | 99 | 99 | 99 | 99 | 99 | 99 | 99 | 99 | 99 | 99 | 99 | 99 |
|---|---|---|---|---|---|---|---|---|---|---|---|---|---|---|---|
| | | | | | | | | | | | | | | | |
| 99 | | | | | | | | | | | | | | | 99 |
| 99 | 99 | | | | | | | | | | | | | 99 | 99 |
| 99 | 99 | 99 | | | | | | | | | | | 99 | 99 | 99 |
| 99 | 99 | 99 | 99 | | | | | | | | | 99 | 99 | 99 | 99 |
| 99 | 99 | 99 | 99 | 99 | | | | | | | 99 | 99 | 99 | 99 | 99 |
| 99 | 99 | 99 | 99 | 99 | 99 | | | | | 99 | 99 | 99 | 99 | 99 | 99 |
| 99 | 99 | 99 | 99 | 99 | 99 | 99 | | | 99 | 99 | 99 | 99 | 99 | 99 | 99 |
| 99 | 99 | 99 | 99 | 99 | 99 | 99 | 99 | 99 | 99 | 99 | 99 | 99 | 99 | 99 | 99 |

Fig. 13d

| 99 | 99 | 99 | 99 | 99 | 99 | 99 | 99 | 99 | 99 | 99 | 99 | 99 | 99 | 99 | 99 |
|---|---|---|---|---|---|---|---|---|---|---|---|---|---|---|---|
| | | | | | | | | | | | | | | | |
| 99 | | | | | | | | | | | | | | | 99 |
| 99 | 99 | | | | | | | | | | | | | 99 | 99 |
| 99 | 99 | 99 | 99 | | | | | | | | | 99 | 99 | 99 | 99 |
| 99 | 99 | 99 | 99 | | | | | | | | | 99 | 99 | 99 | 99 |
| 99 | 99 | 99 | 99 | 99 | 99 | 99 | 99 | 99 | 99 | 99 | 99 | 99 | 99 | 99 | 99 |
| 99 | 99 | 99 | 99 | 99 | 99 | 99 | 99 | 99 | 99 | 99 | 99 | 99 | 99 | 99 | 99 |
| 99 | 99 | 99 | 99 | 99 | 99 | 99 | 99 | 99 | 99 | 99 | 99 | 99 | 99 | 99 | 99 |
| 99 | 99 | 99 | 99 | 99 | 99 | 99 | 99 | 99 | 99 | 99 | 99 | 99 | 99 | 99 | 99 |

APPARATUS AND METHOD FOR HIERARCHICAL STEREO MATCHING

TECHNICAL FIELD

The present invention relates to an image processing technique, and more particularly, to an apparatus and a method for hierarchical stereo matching, used in a three-dimensional image processing system.

BACKGROUND ART

In general, stereo matching is a technique for detecting how far an object is distant through matching between pixels of left and right images.

For example, if one finger is positioned closely between both eyes, the finger is positioned at a right side when only the left eye is open, but the finger is positioned at a left side when only the right eye is open. On the other hand, when a person sees a mountain peak, the mountain peak will be positioned in the middle between both eyes when only the left eye is open or when only the right eye is open.

In the stereo matching, when an image is obtained using two cameras, the position at which an object is photographed by each of the cameras is changed depending on a distance. In this case, distance information is obtained using the information on the change in distance.

The difference between left and right images will be described using a photograph as an example. FIGS. 1A and 1B are exemplary views illustrating left and right images, respectively. As shown in FIGS. 1A and 1B, it can be seen that the difference in the position of an object shown in a dark color between the left and right images is large but the difference in the position of a background shown in a light color between the left and right images is small.

FIGS. 2A and 2B illustrate distance information of the left image of FIG. 1A and distance information of the right image of FIG. 1B, respectively. In FIGS. 2A and 2B, as the color of an object is brighter, the distance of the object from a camera is closer.

While a person recognizes distance information using left and right images, a computer cannot recognize using such a manner. Therefore, the computer uses a stereo matching technique. The stereo matching is a technique for detecting to which pixels of corresponding left and right images pixels of left and right images are matched, respectively.

In the stereo matching technique, it is assumed that the left and right images are rectified. When a photograph is arbitrarily taken using a stereo camera, the photograph is in an unrectified state as shown in FIG. 3A.

When an image is taken using a stereo camera, FIG. 3A illustrates an example of an unrectified image and FIG. 3B illustrates an example of a rectified image.

That is, the image of FIG. 3A means that left and right images are not rectified. If rectification is performed as shown in FIG. 3B in order to compensate for the unrectification between the left and right images, the left and right images are rectified, so that the left and right images have the same focal distance and the same baseline. The longitudinal positions of the left and right images are also rectified, so that when one line is laterally extracted from each of the left and right images, the extracted lines of the left and right images indicate the same portion.

Several methods are used as the stereo matching technique, and a Trellis is used as a representative of the several methods.

The Trellis is a stereo matching method of detecting a matching point by comparing one lines respectively extracted from left and right images. In the Trellis, the matching is performed independently from other lines by comparing one lines respectively extracted from left and right images. Therefore, streak noise in which lateral lines frequently occur in an image is frequently generated, which results in deterioration in quality of the image.

DISCLOSURE OF INVENTION

Technical Problem

The present invention is conceived to solve the aforementioned problems. Accordingly, an object of the present invention is to provide an apparatus and a method for stereo matching, in which a Trellis is performed on a small image using an image pyramid with a hierarchical structure, and the transition of a large image is estimated, so that it is possible to reduce the influence of noise.

Solution to Problem

In one general aspect of the present invention, there is provided an apparatus for hierarchical stereo matching, the apparatus comprising: a hierarchical structure forming unit configured to form a reduced image by reducing the sizes of left and right images obtained using a stereo camera to a half predetermined times; and a trellis unit configured to perform a first Trellis on the reduced image, and magnify the size and the brightness of the image subjected to the first Trellis and then perform a second Trellis on the magnified image.

Preferably, but not necessarily, the trellis unit repetitively performs the magnification of the size and the brightness of the image and the second Trellis the predetermined times.

Preferably, but not necessarily, the trellis unit performs the second Trellis on peripheral pixels of previous disparity.

Preferably, but not necessarily, the hierarchical structure forming unit comprises: a blurring unit configured to evaluate an average of an arbitrary pixel with predetermined peripheral pixels and store the evaluated average in the corresponding pixel; and a sub-sampling unit configured to select one of several pixels.

Preferably, but not necessarily, the sub-sampling unit selects one of four pixels.

Preferably, but not necessarily, the trellis unit comprises: a line extracting unit configured to extract a line corresponding to a corresponding point of an image; a brightness difference calculating unit configured to calculate brightness differences with respect to pixels of the line extracted by the line extracting unit; a path specifying unit configured to specify paths using the brightness differences and a predetermined mismatching parameter; an optimal path determining unit configured to determine an optimal path from the paths specified by the path specifying unit; and a magnifying unit configured to magnify the size/brightness of the image.

Preferably, but not necessarily, the brightness difference calculating unit applies the brightness differences to a Trellis structure.

Preferably, but not necessarily, the path specifying unit, at an mismatching node of the Trellis structure, specifies a minimum value among an equal level value of a previous stage, a value obtained by adding the mismatching parameter to a higher level value, and a value obtained by adding the mismatching parameter to a lower level value.

Preferably, but not necessarily, the path specifying unit, at a matching node of the Trellis structure, specifies a minimum value by adding its own node value to the equal level value of the previous stage.

Preferably, but not necessarily, the optimal path determining unit determines an optimal path by determining a disparity for minimizing energy.

Preferably, but not necessarily, when the second Trellis is performed, the brightness difference calculating unit calculates brightness differences with respect to peripheral pixels of a previous disparity region.

In another general aspect of the present invention, a method for hierarchical stereo matching, the method comprising: forming a reduced image by reducing left and right images; performing a first Trellis on the reduced image; generating a magnified image by magnifying the size and brightness of the reduced image; and performing a second Trellis on the magnified image.

Preferably, but not necessarily, the forming of the reduced image comprises: evaluating an average of an arbitrary pixel with predetermined peripheral pixels and storing the evaluated average in the corresponding pixel; and selecting one of several pixels.

Preferably, but not necessarily, the forming of the reduced image further comprises repetitively performing the storing and the selecting predetermined times.

Preferably, but not necessarily, the performing of the first Trellis comprises: extracting a line of the reduced image; calculating brightness differences with respect to all pixels of the line and applying the calculated brightness differences to a Trellis structure; specifying paths using the brightness differences and a predetermined mismatching parameter; and determining an optimal path from the specified paths.

Preferably, but not necessarily, the apparatus further comprises repetitively performing the generating of the magnified image and the performing of the second Trellis the predetermined times.

Preferably, but not necessarily, the performing of the second Trellis comprises: extracting a line of the magnified image; calculating brightness differences with respect to peripheral pixels of a previous disparity region and applying the calculated brightness differences to the Trellis structure; specifying paths using the brightness differences and the predetermined mismatching parameter; and determining an optimal path from the specified paths.

Preferably, but not necessarily, the specifying of the paths comprises: specifying, at an mismatching node of the Trellis structure, a minimum value among an equal level value of a previous stage, a value obtained by adding the mismatching parameter to a higher level value, and a value obtained by adding the mismatching parameter to a lower level value; and specifying, at a matching node of the Trellis structure, a minimum value by adding its own node value to the equal level value of the previous stage.

Preferably, but not necessarily, the determining of the optimal path includes determining the optimal path by determining a disparity for minimizing energy.

Advantageous Effects of Invention

As described above, according to the present invention, it is possible to estimate, in advance, which result an image will cause using the hierarchical structure, and to output an exact result using the estimated result.

Further, an image pyramid with the hierarchical structure is used in the present invention, so that it is possible to lower the complexity of calculation and to estimate, in advance, a result using a small amount of calculation.

BRIEF DESCRIPTION OF DRAWINGS

FIGS. 1A and 1B are exemplary views illustrating left and right images, respectively.

FIGS. 2A and 2B illustrate distance information of the left image of FIG. 1A and distance information of the right image of FIG. 1B, respectively.

FIG. 3A illustrates an example of an unrectified image and FIG. 3B illustrates an example of a rectified image, when photographing is performed using a stereo camera.

FIG. 9A is an exemplary view illustrating a Trellis.

FIG. 9B is an exemplary view illustrating a process of the Trellis.

FIG. 9C is an exemplary view illustrating from which path the value of each node comes.

FIG. 9D is an exemplary view illustrating a process of evaluating a disparity for energy minimization using the path of FIG. 9C.

FIG. 10 is a configuration view of an apparatus for hierarchical stereo matching according to an embodiment of the present invention.

FIG. 11 is a detailed structural view illustrating an embodiment of a hierarchical structure forming unit of FIG. 10.

FIG. 12 is a detailed structural view illustrating an embodiment of a trellis unit of FIG. 10.

FIG. 13A is an exemplary view illustrating a result obtained by performing Trellis on a reduced image according to an embodiment of the present invention.

FIG. 13B is an exemplary view illustrating a result obtained by magnifying an image of FIG. 13 using a magnifying unit.

FIG. 13C is an exemplary view illustrating a result obtained by applying the uppermost line of FIG. 13B to a Trellis structure.

FIG. 13D is an exemplary view illustrating a result obtained by providing limitation conditions to FIG. 13C according to an embodiment of the present invention.

MODE FOR THE INVENTION

Figure 3B:
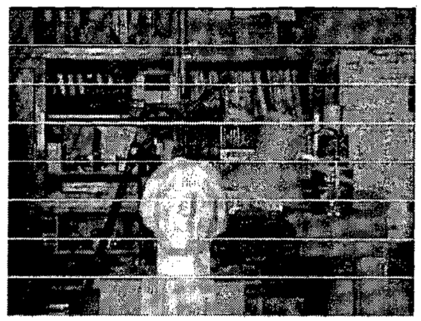

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

It will be understood that, although the terms "first," "second," etc. may be used herein to describe various elements, these elements should not be limited by these terms. These terms are only used to distinguish one element from another element. Thus, a "first" element discussed below could also be termed as a "second" element without departing from the teachings of the present invention.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise.

It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

In the drawings, the thickness of layers, films and regions are exaggerated for clarity. Like numerals refer to like elements throughout.

Hereinafter, a Trellis method that is a stereo matching technique will be first described, and an apparatus for hierarchical stereo matching according to an embodiment of the present invention, to which the Trellis method is applied, will be then described with reference to the accompanying drawings.

First, the relationship between a disparity d and a three-dimensional (3D) distance Z will be described. A stereo matching restructures a three-dimensional space from two-dimensional (2D) left and right images, i.e., a stereo image. In the stereo matching technique, corresponding points are extracted from two 2D images, and 3D information is estimated using a geometric relationship between the corresponding points.

Figure 4:
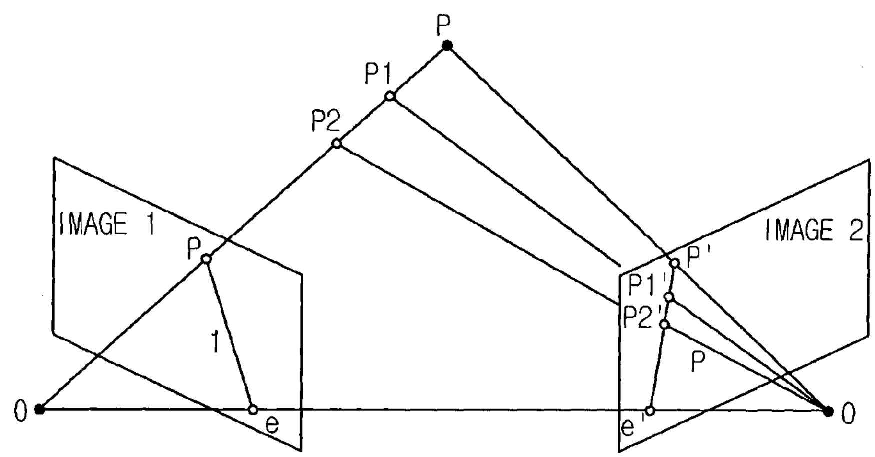
FIG. 4 is an exemplary view illustrating an epipolar line for estimating three-dimensional information.

FIG. 4 is an exemplary view illustrating an epipolar line for estimating three-dimensional information.

In order to estimate 3D information using a geometric relationship between corresponding points extracted from a 2D image, a point corresponding to one point P of one image (a first image) is necessarily extracted from the other image (a second image) in a stereo image. In this case, it can be seen that the point (e.g., P', P1' or P2') exists on an epipolar line of the corresponding image (i.e., the second image) with respect to the point P in the reference image (i.e., the first image). If the rectification of the epipolar line is performed, the stereo matching can be performed by examining only two single scan lines expanded horizontally.

Figure 5:
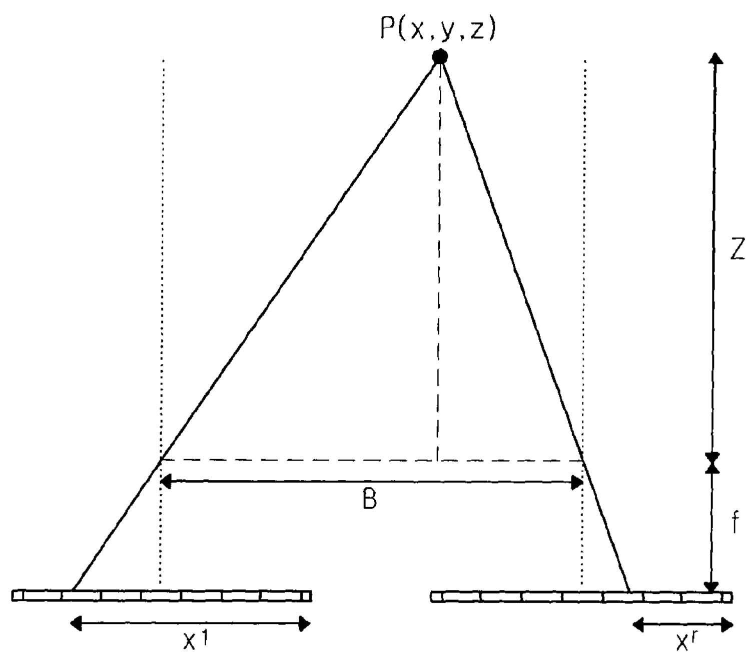
FIG. 5 is an exemplary view illustrating a relationship between disparity and three-dimensional information.

FIG. 5 is an exemplary view illustrating a relationship between disparity and three-dimensional information, which illustrates a relationship between left and right images obtained from a stereo camera and an object formed in the images.

The disparity d between corresponding pixels is a corresponding point difference on a single line, which can be represented by the following Math Figure 1.

MathFigure 1

$$d=x^r-x^l \qquad \text{[Math.1]}$$

Here, d denotes a disparity, $x^r$ denotes an x-axis length in the right image, and $x^l$ denotes an x-axis length in the left image. When one point P(x,y,z) is photographed into left and right images, the relationship between parameters can be obtained from a geometric structure as represented in the following Math Figure 2.

MathFigure 2

$$x^r-x^l:f=B:Z \qquad \text{[Math.2]}$$

Here, f denotes a focal length, B (base length) denotes a distance between two cameras, and Z denotes a 3D distance. If Math Figure 2 is applied to Math Figure 1, the 3D distance Z can be represented by the following Math Figure 3.

MathFIG. 3

$$Z=\frac{fB}{d} \qquad \text{[Math. 3]}$$

Thus, the 3D information, i.e., depth of an object can be estimate using the focal length f, the distance B between the two cameras and the corresponding points of the two images.

A general camera stores a 3D image as 2D discrete components in a charge coupled device (CCD) sensor or complementary metal oxide semiconductor (CMOS) sensor. That is, the observed image is represented by discrete points.

Figure 6:
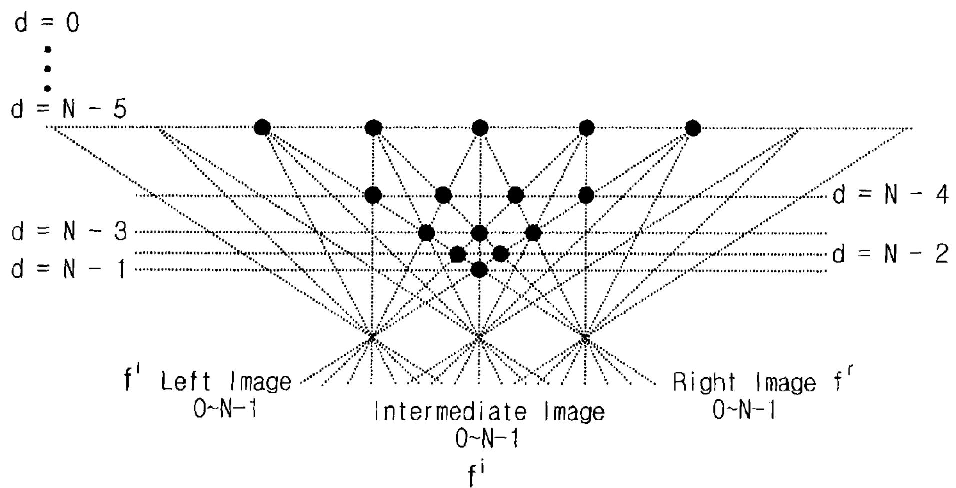
FIG. 6 is an exemplary view illustrating disparities caused by discrete components in left and right images.

FIG. 6 is an exemplary view illustrating disparities caused by discrete components in left and right images.

As shown in FIG. 6, disparities may be represented by discrete components in left and right images. The disparity of a point most distant from the image is d=0 (i.e., z=8), and all contact points on the same line have the same disparity. As the 3D depth Z (3D length) increases, the disparity decreases.

A black point, as shown in FIG. 6, is a node at which matching for verifying whether or not the 3D coordinate is the surface of an object occurs, and is defined at a place where projection lines meet each other. When proper matching occurs at a certain node, pixels of the two images, which meet at the node, make a pair, which is referred to as matching. On the contrary, a region in which the surface of the object is viewed in one of the two images but is not viewed in the other of the two images may exist, which is referred to as mismatching.

In FIG. 6, one projection line at a left side meets a plurality of projection lines at a right side. In this case, correct matching occurred at only the matching node at which the projection line at the left side meets one of the plurality of projection lines at the right side. As such, if the relation between projection lines having an image projected thereonto is restricted, the number of paths to be searched is decreased, so that it is possible to improve efficiency of calculation and to reduce the amount of calculation.

The stereo matching technique is based on maximum a posteriori (MAP) estimation for searching a disparity allowing an energy function to be minimized. To this end, an optimal path is searched using a viterbi algorithm based on dynamic programming (DP). That is, the stereo matching technique may be performed using a method of defining paths at matching and mismatching nodes, summing up costs provided for each of the paths and detecting a path having the minimum summed cost.

Figure 7:
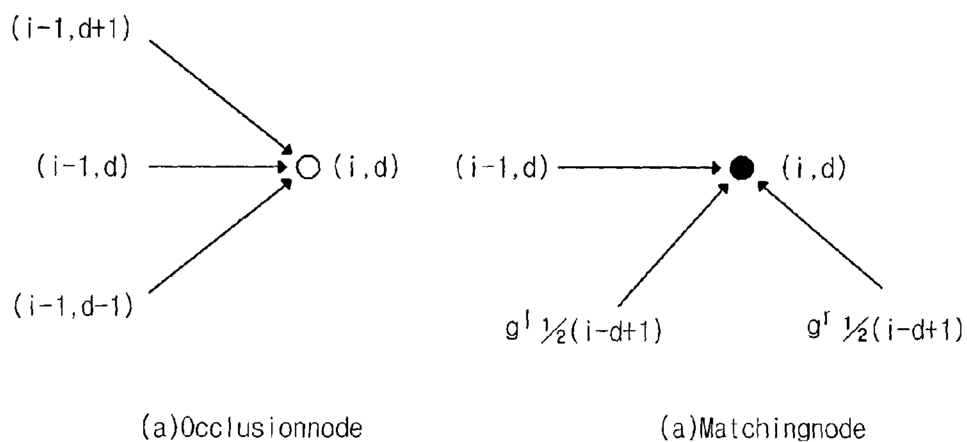
FIG. 7 is an exemplary view illustrating a cost for each path at a matching node and a mismatching node.

FIG. 7 is an exemplary view illustrating a cost for each path at a matching node and a mismatching node. Here, the black point indicates a matching node, and the white point indicates a mismatching node.

If it is assumed that a current stage is a stage i, the path having the minimum summed cost is a path having a minimum value among values obtained by adding sums of costs for each path from a stage i−1 to the stage i to the minimum value up to the stage i−1.

At the mismatching node, a path is formed by specifying a minimum value among an equal level value of the previous stage, a value obtained by adding an mismatching parameter to a higher level value, and a value obtained by adding the mismatching parameter to a lower level value. At the matching node, a path is formed by adding its own node value to a node value at the equal level of the previous stage. In this case, pixel values of left and right images are required at the matching node so as to calculate a cost defined as a matching cost.

The optimal path exists between the matching node and the mismatching node, and is identical to the result obtained by assigning matching and mismatching costs to these paths. One stage is defined by nodes in a longitudinal line on a path from the left to the right in relation to time in a lattice structure.

In order to apply the Trellis, conditions are as follows.

First, the position at which an object exists in a right image cannot be further positioned at the right side than that at which the object exists in a left image. Since a left camera is further positioned at the left side than a right camera, it will be apparent that the object is further positioned at the left side than the right image. When it is assumed that the disparity in the stage i is $d_i$, $$d_i = x_l - x_r,$$

and no negative disparity exists.

Second, $d_0$ that is the first disparity and $d_{2N}$ that is the last disparity have a value of zero. The Trellis is basically performed in such a manner that a path is traced from $d_{2N}$. In this case, if a basic value is not specified, the Trellis cannot be performed. If $d_{2N}$ is specified as a certain value, the path starts from the value. However, since $d_{2N}$ is not currently specified, the path starts in the sate that $d_{2N}$ is specified as a value of zero.

Third, the difference between $d_i$ and $d_{i-1}$ does not exceed 1. This is a condition for simplifying the implementation of the Trellis. Since the system is necessarily implemented using hardware, the condition is essentially required. If the condition does not exist, the number of nodes changeable at the mismatching node increases, and hence the complexity increases.

These are three conditions of the conventional Trellis. In the present invention, a condition is added to the three conditions due to the application of a hierarchical structure. This will be described later.

The algorithm of searching for an optimal path is as follows:

The costs of all nodes in the stage i=0 are initialized as represented by the following Math Figure 4. Here, the initialization is repetitively performed in a forward direction along 'i=1, . . . , 2N' so as to obtain an optimal path and an optimal cost from the assigned disparity d and each of the nodes.

MathFIG. 4

$$\delta(0, j) = \begin{cases} 0 & j = 0 \\ \infty & \text{otherwise} \end{cases} \quad \text{[Math. 4]}$$

When i+d is an even number, the cost denotes an mismatching node. The cost and the optimal disparity at the mismatching node are represented by the following Math Figure 5.

MathFigure 5

$$\delta(i,j) = \min_{\alpha \in [-1,1]} \delta(i-1, j+\alpha) + \gamma\alpha^2$$

$$\Psi(i,j) = \arg\min_{\alpha \in [-1,1]} \delta(i-1, j+\alpha) + \gamma\alpha^2 \quad \text{[Math.5]}$$

When i+d is an odd number, the cost denotes a matching node. The cost and the optimal disparity at the matching node are represented by the following Math Figure 6.

MathFIG. 6

$$\delta(i, j) = \delta(i-1, j) + \left| f^l\left(\frac{1}{2}(i - j + 1)\right) - f^r\left(\frac{1}{2}(i + j + 1)\right) \right| \quad \text{[Math. 6]}$$

When i is 2N and j is zero, the forward repetitive computation is completed. Then, initial values (a cost and an optimal disparity) in the reverse direction are determined as represented by the following Math Figure 7.

MathFigure 7

$$\delta = \delta(2N, 0)$$

$$\Psi = \Psi(2N, 0) \quad \text{[Math.7]}$$

Figure 8:
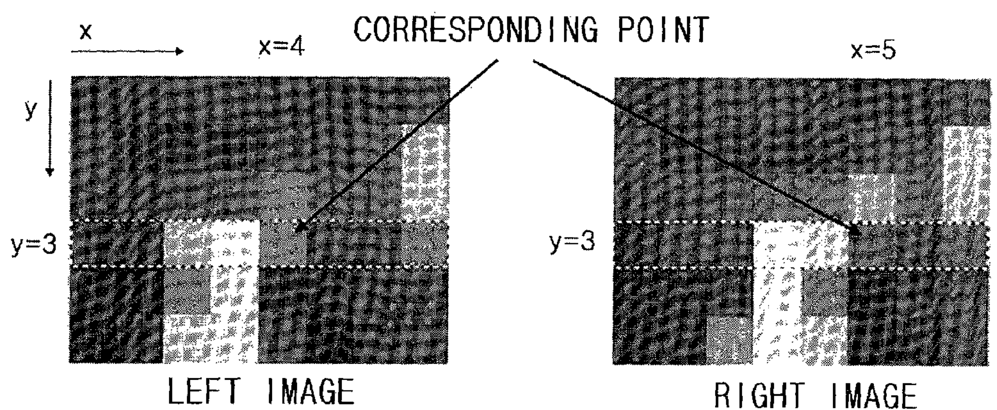
FIG. 8 is an exemplary view illustrating left and right images photographed using two cameras.

Thereafter, reverse recursive searching is performed in the reverse direction of the stage as represented by the following Math Figure 8, thereby obtaining an optimal disparity.

MathFigure 8

$$\Psi(i-1) = \Psi(i) + \Psi(i, \Psi(i)) \; i = 2N, \ldots, 1 \quad \text{[Math.8]}$$

$\gamma$ denotes an mismatching parameter that satisfies Math Figure 5, and the size of an image is defined as M×N.

The aforementioned method will be described as an example using an actual image.

FIG. 8 is an exemplary view illustrating left and right images photographed using two cameras.

As shown in FIG. 8, the differences in brightness between all pixels are calculated by extracting corresponding lines (a line of y=3 in the left image and a line of y=3 in the right image) in the left and right images.

FIG. 9A is an exemplary view illustrating the Trellis.

For convenience of illustration, the coordinate at the left top is indicated as (0, 0). Both the zeroth lateral line and the seventh lateral line have 99. For convenience of illustration, 99 is a value used rather than infinity (8) for the purpose of convenience of calculation.

1, 0, 0, 8, 9, 4 of (1, 1), (2, 2) (6, 6) are differences between 14 that is a first value of the right image and 13, 14, 14, 22, 23 and 10 of the left image. 8, 8, 0, 1, 12 of (1, 3), (2, 4) (6, 8) are differences between 22 that is a second value of the right image and 14, 14, 22, 23 and 10 of the left image. Pixel differences calculated in such a manner are stored as shown in FIG. 9A.

FIG. 9B is completed in the same manner introduced in FIG. 7, using FIG. 9A. That is, in the case of an mismatching node (node filled with slashes in a light color), the minimum value among values obtained by comparing an equal level value of the previous stage with values respectively obtained by adding a predetermined $\gamma$ (mismatching parameter) to higher and lower level values is stored in the mismatching node. In the case of a matching node (node filled with slashes in a dark color), the value obtained by adding its own value to the equal level value of the previous stage is stored in the matching node.

FIG. 9B is an exemplary view illustrating a process of the Trellis.

The Trellis is related to a problem of energy minimization. If a path when energy is minimized is searched, the searched path is the very depth of an image. The term energy is minimized refers to that the difference in brightness between left and right images is smallest, which means that the most similarly matched value is a path when the energy is minimized.

In FIG. 9B, the rightmost value is 29, 29 and 22 are positioned at the left side of the rightmost value. Since a path having a smaller value is necessarily searched between 22 and 29, 22 is selected.

FIG. 9C is an exemplary view illustrating from which path the value of each node comes. The value '0' is stored when the value stored at the corresponding node comes from the equal level of the previous stage. The value '1' is stored when the value stored at the corresponding node comes from the lower level of the previous stage. The value '−1' is stored when the value stored at the corresponding node comes from the higher level of the previous stage.

FIG. 9D is an exemplary view illustrating a process of evaluating a disparity for energy minimization using the path of FIG. 9C. In FIG. 9D, the node filled with trellis shadow refers a path for minimizing energy, and the portion under the node indicates a disparity of the corresponding path. The disparity can be obtained by adding a corresponding value to the value stored in the path along the left direction, starting from zero.

The apparatus and method for hierarchical stereo matching using the Trellis according to an embodiment of the present invention will be described below.

FIG. 10 is a configuration view of an apparatus for hierarchical stereo matching according to an embodiment of the present invention.

As shown in FIG. 10, the apparatus for hierarchical stereo matching according to the embodiment of the present invention comprises a hierarchical structure forming unit 10 and a trellis unit 20.

The hierarchical structure forming unit 10 reduces left and right images obtained using a stereo camera (not shown) to $$\left(\frac{1}{2}\right)^n.$$

In the embodiment of the present invention, an image pyramid having a hierarchical structure is used to reduce streak noise. The image pyramid is a method in which information in a reduced image is used by repetitively reducing the size of an image to a half.

When the Trellis is performed in the reduced image, the transition of an image having high complexity can be estimated using information of an image having low complexity.

The hierarchical structure is frequently used in image processing. If an image of which size is reduced by ¼ as compared with that of the original image is used, its complexity is reduced to ¼. Since the reduced image has most information of the original image, the transition of the original image can be estimated using the reduced image. The hierarchical structure may be obtained by repetitively performing degradation and sub-sampling. This will be described with reference to FIG. 11.

FIG. 11 is a detailed structural view illustrating an embodiment of the hierarchical structure forming unit of FIG. 10.

As shown in FIG. 11, the hierarchical structure forming unit 10 according to the embodiment of the present invention comprises a blurring unit 11 and a sub-sampling unit 12.

It will be obvious to those skilled in the art that the size of each of the left and right images is reduced to ½ when the left and right images pass through the blurring unit 11 and the sub-sampling unit 12 in the hierarchical structure forming unit 10, and the size of each of the left and right images is reduced to ¼ when blurring and sub-sampling are performed by feeding back the left and right images passing through the sub-sampling unit 12 to the blurring unit 11.

The blurring unit 11 evaluates an average of an arbitrary pixel with peripheral pixels and stores information of several pixels in one pixel.

For example, in order to obtain the blurring result of a pixel at a position (4, 4), the blurring unit 11 evaluates an average of brightnesses of pixels at positions (3, 3), (3, 4), (3, 5), (4, 3), (4, 4), (4, 5), (5, 3), (5, 4) and (5, 5), which are peripheral pixels of the pixel at the position (4, 4), and newly stores the average in the pixel at the position (4, 4). The range of peripheral pixels may be specified wider. The method of specifying peripheral pixels are variously modified, which will be obvious in the art pertinent to the present invention.

The sub-sampling unit 12 selects any one of several pixels and reduces the size of the selected pixel. Since the hierarchical structure forming unit 10 according to the embodiment of the present invention reduces the size of an image to ½, the sub-sampling unit 12 selects any one of four pixels and reduces the size of the selected pixel.

Since the sub-sampling unit 12 selects any one of four pixels, information of the original image disappears. However, the blurring unit 11 performs the blurring before the sub-sampling unit 12 performs the sub-sampling, and thus image information is preserved as much as possible.

FIG. 12 is a detailed structural view illustrating an embodiment of the trellis unit of FIG. 10.

As shown in FIG. 12, the trellis unit 20 according to the embodiment of the present invention comprises a scan line extracting unit 21, a brightness difference calculating unit 22, a path specifying unit 23, a storing unit 24, an optimal path determining unit 25 and a magnifying unit 26.

The line extracting unit 21 extracts lines (lines of y=3 in FIG. 8) respectively corresponding to the corresponding points in the left and right images reduced by the hierarchical structure forming unit 10. An example of the extracted lines are as shown in FIGS. 9A to 9D.

The brightness difference calculating unit 22 calculates brightness differences between pixels of the lines extracted by the line extracting unit 21. The result of the brightness differences calculated by the brightness difference calculating unit 22 is as shown in FIG. 9A.

When the Trellis is performed on a reduced image, the brightness difference calculating unit 22 calculates brightness differences between all pixels of extracted lines. However, when the Trellis is performed on a reduced image of which size and brightness are magnified, the brightness difference calculating unit 22 may calculate brightness differences between peripheral pixels of the previous disparity region. This will be described in detail later.

The path specifying unit 23 specifies a path using the brightness difference calculated by the brightness difference calculating unit 22 and a predetermined mismatching parameter $\gamma$. The method in which the path specifying unit 23 specifies the path is as described with reference to FIG. 9B.

That is, in the case of an mismatching node (node filled with slashes in a light color), the minimum value among values obtained by comparing the equal level value of the previous stage with values respectively obtained by adding a predetermined $\gamma$ (mismatching parameter) to higher and lower level values is stored in the mismatching node. In the case of a matching node (node filled with slashes in a dark color), the value obtained by adding its own value to the equal level value of the previous stage is stored in the matching node.

The path specified by the path specifying unit 23 may be stored in the storing unit 24.

The optimal path determining unit 25 determines an optimal path from the path specified by the path specifying unit 23. That is, the optimal path determining unit 25 determines a disparity for minimizing energy. The process of determining the optimal path and the disparity is as described in FIG. 9D.

As such, the trellis unit 20 performs a Trellis on all lines of an image with a hierarchical structure, and the magnifying unit 26 magnifies the size and brightness of the image subjected to the Trellis to be two times greater than those of the original image. In the image reduced by the hierarchical structure forming unit 10, the brightness of the image is reduced to a half when the lateral size of the image is reduced to a half. Thus, the magnifying unit 26 magnifies the brightness of the image to be two times greater than that of the original image, as well as the lateral and longitudinal sizes of the image.

The Trellis is again performed on the image magnified by the magnifying unit 26 via the brightness difference calculating unit 22, the path specifying unit 23 and the optimal path determining unit 25.

When the hierarchical structure forming unit 10 reduces the lateral and longitudinal sizes of the original image to ½, the reduced image is magnified by passing the image through the magnifying unit 26 once. When the hierarchical structure forming unit 10 reduces the lateral and longitudinal sizes of the original image to $$\left(\frac{1}{2}\right)^n,$$

the reduced image is magnified by passing the image through the magnifying unit 26 n times. This will be obvious in the art pertinent to the present invention.

The image matching of the apparatus for hierarchical stereo matching according to the embodiment of the present invention will be described with reference to the accompanying drawings.

FIG. 13A is an exemplary view illustrating a result obtained by performing Trellis on a reduced image using the trellis unit 20 of FIG. 10 according to an embodiment of the present invention. When the size of the original image is 8×8, the size of the image, reduced to ½ by the hierarchical structure forming unit 10, is 4×4.

FIG. 13B is an exemplary view illustrating a result obtained by magnifying the image of FIG. 13 using the magnifying unit 26.

As shown in FIG. 13B, the magnifying unit 26 magnifies the size and brightness of the image to be two times greater than those of the original image. Since four pixels are reduced to one pixel through the sub-sampling process of the sub-sampling unit 12, the one pixel is magnified to the four pixels when the image is restored.

The topmost line will be applied to the Trellis structure.

FIG. 13C is an exemplary view illustrating a result obtained by applying the uppermost line of FIG. 13B to the Trellis structure.

As shown in FIG. 13C, matching is performed with respect to image information indicated by a solid-line frame in a dark color as the result of the reduced image, and therefore, the Trellis can be performed within the solid-line frame in the dark color in a large image. However, since the solid-line frames are not connected to one another, this does not correspond to the third condition of the Trellis.

It is difficult to exactly estimate depth information of the original image under the condition that depth information of the reduced image does not completely correspond to that of the original image. Therefore, the limit condition of a depth that may be possessed by the original image is provided.

That is, when the depth information of the reduced image is defined as pi and the depth information of the original image is defined as di, di will have a value identical to or slightly smaller or larger than that of pi. If it is assumed that the range of is pi±β, the result of the original image may be influenced by the result of the reduced image. The β is an arbitrary value. The di=pi±β is another condition for applying the Trellis according to the embodiment of the present invention. This will be referred to as a 'fourth condition of the Trellis method.'

FIG. 13D is an exemplary view illustrating a result obtained by providing the limitation conditions to FIG. 13C according to an embodiment of the present invention.

As shown in FIG. 13D, the Trellis application range of image information indicated by a solid-line frame in a dark color, which is depth information of the reduced image, is magnified by the dotted-line frame. A case the β is 2 is shown in FIG. 13D.

As such, when the Trellis is performed on the magnified image, the brightness difference calculating unit 22 does not calculate brightness differences with respect to all the pixels of the line extracted by the line extracting unit 21 but calculates brightness differences with respect to peripheral pixels of the previous disparity region.

Thus, since the calculation of brightness differences with respect to portions except the dotted-line frame can be omitted, the complexity of calculation is lowered.

Figure 14A:
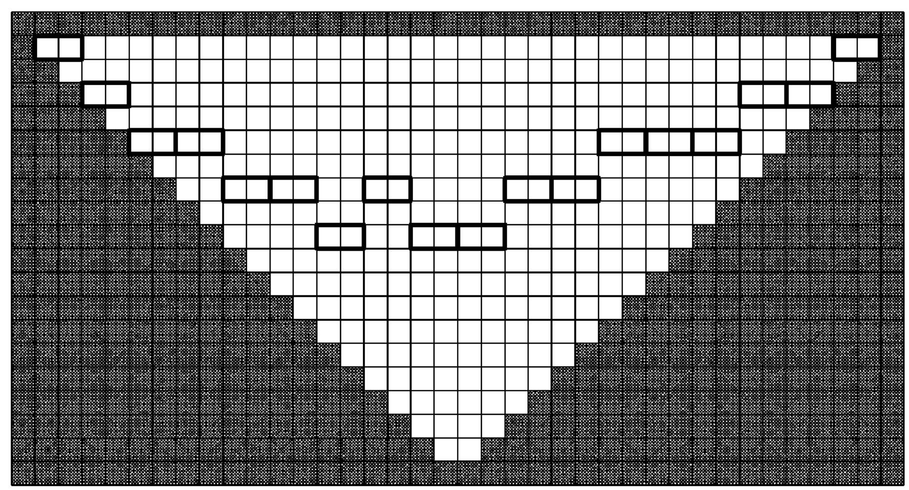
FIGS. 14A and 14B are exemplary views illustrating results obtained by applying processes of FIGS. 13C and 13D to an image having a large size.
Figure 14B:
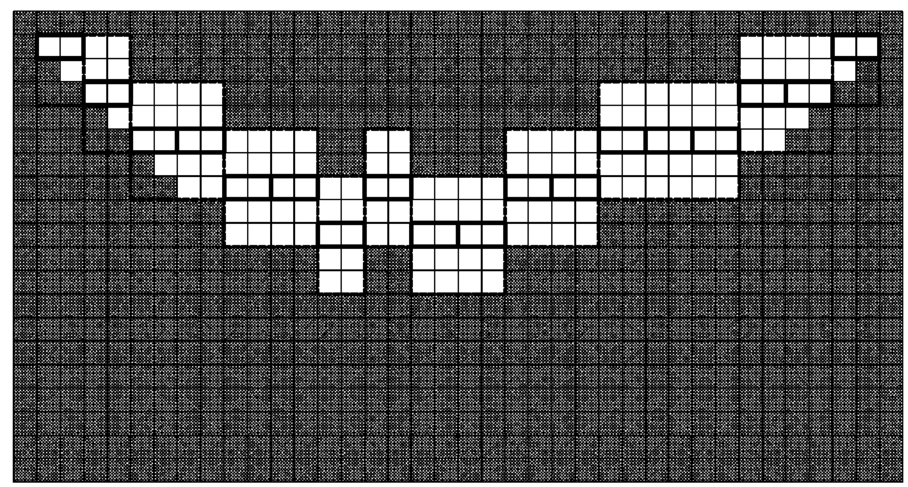

FIGS. 14A and 14B are exemplary views illustrating results obtained by applying the processes of FIGS. 13C and 13D to an image having a large size.

As shown in FIGS. 14A and 14B, it is sufficient that the Trellis is applied to only the white portion in FIG. 14B. Thus, when the hierarchical structure is used according to the embodiment of the present invention, the amount of calculation can be remarkably reduced as compared with the amount to be originally calculated.

Figure 15A:
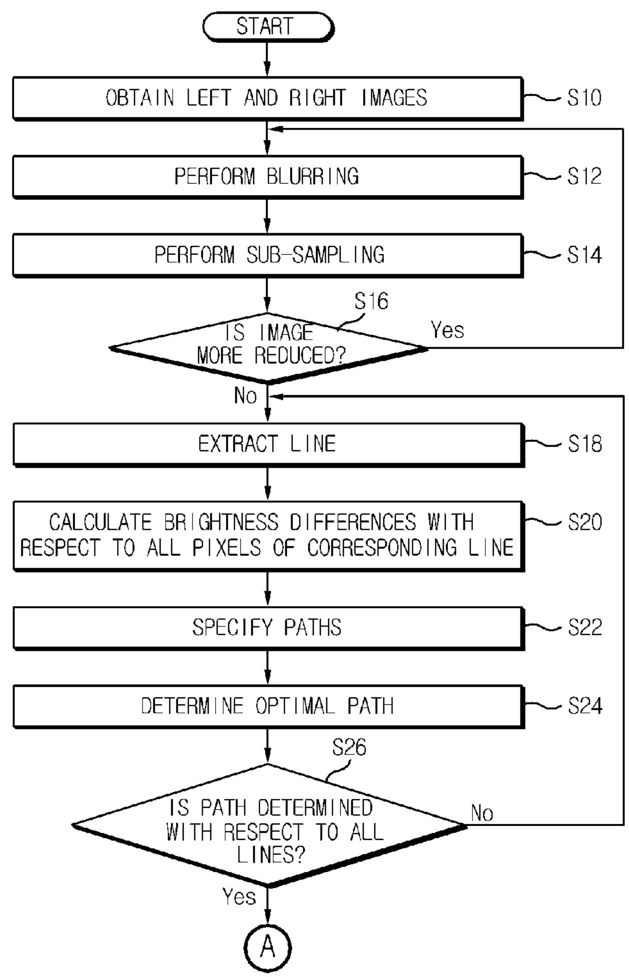
FIGS. 15A and 15B are flowcharts illustrating a method for hierarchical stereo matching according to an embodiment of the present invention.
Figure 15B:
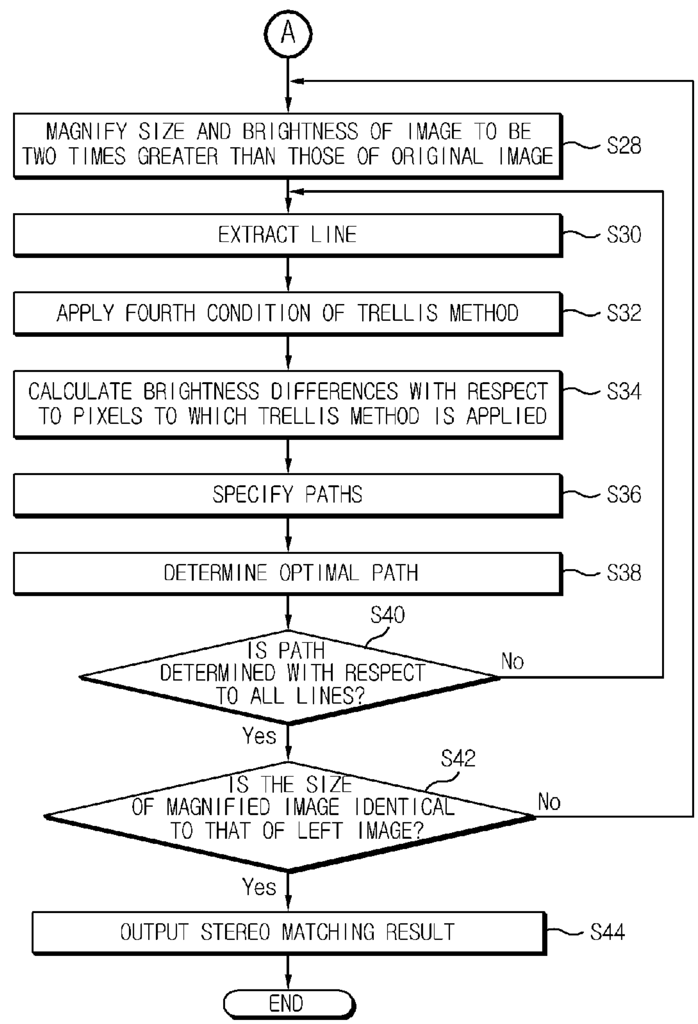

FIGS. 15A and 15B are flowcharts illustrating a method for hierarchical stereo matching according to an embodiment of the present invention.

As shown in FIGS. 15A and 15B, in the method for hierarchical stereo matching according to the embodiment of the present invention, left and right images are first obtained from a stereo camera (not shown) (S10). Then, the blurring unit 11 performs blurring on the left and right images having a predetermined size and brightness (S12), and the sub-sampling unit 12 performs sub-sampling on the left and right images (S14).

As described above, the blurring (S12) includes evaluating an average of an arbitrary pixel with peripheral pixels and storing information of several pixels in one pixel, and the sub-sampling (S14) includes selecting any one of four pixels and reducing the size of the selected pixel.

Through the blurring (S12) and the sub-sampling (S14), the size and brightness of each of the left and right images constituting the original image are reduced to ½.

Since the original image can be reduced to $$\left(\frac{1}{2}\right)^n$$

in the embodiment of the present invention, the image can be reduced to $$\left(\frac{1}{2}\right)^n$$

by performing the blurring (S12) and the sub-sampling (S14) as frequent as desired (S16).

Thereafter, the line extracting unit 21 extracts lines of the reduced left and right images (S18), and the brightness difference calculating unit 22 calculates brightness differences between all pixels of the corresponding lines (S20). Then, the calculated brightness differences are applied to the Trellis.

The path specifying unit 23 specifies paths using the brightness differences calculated in S18 and a predetermined mismatching parameter γ (S22). The optimal path determining unit 25 determines an optimal path from the paths specified in S22 (S24). That is, the optimal path determining unit 25 determines a disparity for minimizing energy.

As such, S20 to S24 of determining the optimal path with respect to the extracted lines are performed on all lines of the reduced image (S26).

Thereafter, the magnifying unit 26 the size and brightness of the image of which optimal path has been determined to be two times greater than those of the original image (S28), and the line extracting unit 21 re-extracts lines of the left and right images (S30). Then, the fourth condition of the Trellis is applied to the extracted lines (S32). The example in which the fourth condition of the Trellis is applied to the extracted lines is as described with reference to FIGS. 13D and 14D. As such, if the fourth condition of the Trellis is applied, the number of pixels to be calculated when the Trellis is performed again is decreased as described above.

Thereafter, the brightness difference calculating unit 22 calculates brightness differences between pixels on which the Trellis is to be performed on the corresponding lines (S34), and the calculated brightness differences are applied to the Trellis structure. That is, the brightness difference calculating unit 22 calculates brightness differences with respect to pixels to which the fourth condition of the Trellis is applied. In this case, the brightness difference calculating unit 22 calculates brightness differences with respect to peripheral pixels of a disparity region determined by the previous Trellis.

The path specifying unit 23 specifies paths using the brightness differences between pixels, calculated in S34, and the predetermined mismatching parameter γ (S36). The optimal path determining unit 25 determines an optimal path from the paths specified in S36 (S38). That is, the optimal path determining unit 25 determines an optimal path for minimizing energy.

As such, S32 to S38 of determining the optimal path with respect to the extracted lines are performed on all lines of the reduced image (S40).

Thereafter, when the size of the magnified image is not identical to that of the original image (S42), the size and brightness of the corresponding image are magnified (S28), and S30 to S40 can be performed on the magnified image.

According to the embodiment of the present invention, it will be obvious to those skilled in the art that when the image is reduced to $$\left(\frac{1}{2}\right)^n$$

in S16, S28 to S40 are performed n times.

In the matching method according to the embodiment of the present invention, the stereo matching result of the original image is finally output (S44).

As described above, it is possible to estimate, in advance, which result an image will cause, using the hierarchical structure, and to output an exact result using the estimated result. Further, an image pyramid with the hierarchical structure is used, so that it is possible to lower the complexity of calculation and to estimate, in advance, a result using a small amount of calculation.

Although the present invention has been described in connection with the preferred embodiments, the embodiments of the present invention are only for illustrative purposes and should not be construed as limiting the scope of the present invention. It will be understood by those skilled in the art that various changes and modifications can be made thereto within the technical spirit and scope defined by the appended claims.

The invention claimed is:

1. An apparatus for hierarchical stereo matching, the apparatus comprising:

a hierarchical structure forming unit configured to form a reduced image by reducing the sizes of left and right images obtained using a stereo camera to a half predetermined times; and a trellis unit configured to perform a first Trellis on the reduced image, and magnify the size and the brightness of the image subjected to the first Trellis and then perform a second Trellis on the magnified image, wherein the trellis unit performs the second Trellis on peripheral pixels of a disparity region determined by the first Trellis.

2. The apparatus of claim 1, wherein the trellis unit repetitively performs the magnification of the size and the brightness of the image and the second Trellis the predetermined times.

3. The apparatus of claim 1, wherein the hierarchical structure forming unit comprises:

a blurring unit configured to evaluate an average of an arbitrary pixel with predetermined peripheral pixels and store the evaluated average in the corresponding pixel; and a sub-sampling unit configured to select one of several pixels.

4. The apparatus of claim 3, wherein the sub-sampling unit selects one of four pixels.

5. The apparatus of claim 1, wherein the trellis unit comprises:

a line extracting unit configured to extract a line corresponding to a corresponding point of an image;

a brightness difference calculating unit configured to calculate brightness differences with respect to pixels of the line extracted by the line extracting unit;

a path specifying unit configured to specify paths using the brightness differences and a predetermined mismatching parameter;

an optimal path determining unit configured to determine an optimal path from the paths specified by the path specifying unit; and a magnifying unit configured to magnify the size/brightness of the image.

6. The apparatus of claim 5, wherein the brightness difference calculating unit applies the brightness differences to a Trellis structure.

7. The apparatus of claim 6, wherein the path specifying unit, at an mismatching node of the Trellis structure, specifies a minimum value among an equal level value of a previous stage, a value obtained by adding the mismatching parameter to a higher level value, and a value obtained by adding the mismatching parameter to a lower level value.

8. The apparatus of claim 6, wherein the path specifying unit, at a matching node of the Trellis structure, specifies a minimum value by adding its own node value to the equal level value of the previous stage.

9. The apparatus of claim 5, wherein the optimal path determining unit determines an optimal path by determining a disparity for minimizing energy.

10. The apparatus of claim 5, wherein, when the second Trellis is performed, the brightness difference calculating unit calculates brightness differences with respect to the peripheral pixels of the disparity region determined by the first Trellis.

11. A method for hierarchical stereo matching, the method comprising:

forming a reduced image by reducing left and right images;

performing a first Trellis on the reduced image;

generating a magnified image by magnifying the size and brightness of the reduced image; and performing a second Trellis on the magnified image, wherein the second Trellis is performed on peripheral pixels of a disparity region determined by the first Trellis.

12. The method of claim 11, wherein the forming of the reduced image comprises:

evaluating an average of an arbitrary pixel with predetermined peripheral pixels and storing the evaluated average in the corresponding pixel; and selecting one of several pixels.

13. The method of claim 12, wherein the forming of the reduced image further comprises repetitively performing the storing and the selecting predetermined times.

14. The method of claim 11, wherein the performing of the first Trellis comprises:

extracting a line of the reduced image;

calculating brightness differences with respect to all pixels of the line and applying the calculated brightness differences to a Trellis structure;

specifying paths using the brightness differences and a predetermined mismatching parameter; and determining an optimal path among the specified paths.

15. The method of claim 13, further comprising repetitively performing the generating of the magnified image and the performing of the second Trellis the predetermined times.

16. The method of claim 11, wherein the performing of the second Trellis comprises:

extracting a line of the magnified image;

calculating brightness differences with respect to the peripheral pixels of a previous disparity and applying the calculated brightness differences to the Trellis structure;

specifying paths using the brightness differences and the predetermined mismatching parameter; and determining an optimal path among the specified paths.

17. The method of claim 14, wherein the specifying of the paths comprises:

specifying, at an mismatching node of the Trellis structure, a minimum value among an equal level value of a previous stage, a value obtained by adding the mismatching parameter to a higher level value, and a value obtained by adding the mismatching parameter to a lower level value; and specifying, at a matching node of the Trellis structure, a minimum value by adding its own node value to the equal level value of the previous stage.

18. The method of claim 14, wherein the determining of the optimal path includes determining the optimal path by determining a disparity for minimizing energy.

19. The method of claim 16, wherein the specifying of the paths comprises:

specifying, at an mismatching node of the Trellis structure, a minimum value among an equal level value of a previous stage, a value obtained by adding the mismatching parameter to a higher level value, and a value obtained by adding the mismatching parameter to a lower level value; and specifying, at a matching node of the Trellis structure, a minimum value by adding its own node value to the equal level value of the previous stage.

* * * * *